United States Patent
Sommargren et al.

(12) 
(10) Patent No.: US 6,704,112 B1
(45) Date of Patent: Mar. 9, 2004

(54) APPLICATION OF THE PHASE SHIFTING DIFFRACTION INTERFEROMETER FOR MEASURING CONVEX MIRRORS AND NEGATIVE LENSES

(75) Inventors: Gary E. Sommargren, Santa Cruz, CA (US); Eugene W. Campbell, Livermore, CA (US)

(73) Assignee: The Regents of the University of California, Oakland, CA (US)

( * ) Notice: Subject to any disclaimer, the term of this patent is extended or adjusted under 35 U.S.C. 154(b) by 130 days.

(21) Appl. No.: 09/690,935

(22) Filed: Oct. 17, 2000

(51) Int. Cl.[7] .................................................. G01B 9/02
(52) U.S. Cl. ...................................... 356/512; 356/513
(58) Field of Search ................................. 356/512, 513, 356/514, 515, 496, 497, 511, 521, 489, 495

(56) References Cited

U.S. PATENT DOCUMENTS

| | | | |
|---|---|---|---|
| 4,089,607 A | 5/1978 | Rambauske | 356/109 |
| 5,039,223 A | 8/1991 | Gemma et al. | 356/348 |
| 5,548,403 A | 8/1996 | Sommargren | 356/354 |
| 5,815,268 A | * 9/1998 | LaFleur | 356/515 |
| 5,933,236 A | 8/1999 | Sommargren | 356/354 |

FOREIGN PATENT DOCUMENTS

| | | |
|---|---|---|
| WO | WO93/24805 | 12/1993 |
| WO | WO96/22506 | 7/1996 |

* cited by examiner

*Primary Examiner*—Michael Lyons
(74) *Attorney, Agent, or Firm*—John P. Wooldridge; Alan H. Thompson

(57) ABSTRACT

To measure a convex mirror, a reference beam and a measurement beam are both provided through a single optical fiber. A positive auxiliary lens is placed in the system to give a converging wavefront onto the convex mirror under test. A measurement is taken that includes the aberrations of the convex mirror as well as the errors due to two transmissions through the positive auxiliary lens. A second, measurement provides the information to eliminate this error. A negative lens can also be measured in a similar way. Again, there are two measurement set-ups. A reference beam is provided from a first optical fiber and a measurement beam is provided from a second optical fiber. A positive auxiliary lens is placed in the system to provide a converging wavefront from the reference beam onto the negative lens under test. The measurement beam is combined with the reference wavefront and is analyzed by standard methods. This measurement includes the aberrations of the negative lens, as well as the errors due to a single transmission through the positive auxiliary lens. A second measurement provides the information to eliminate this error.

20 Claims, 5 Drawing Sheets

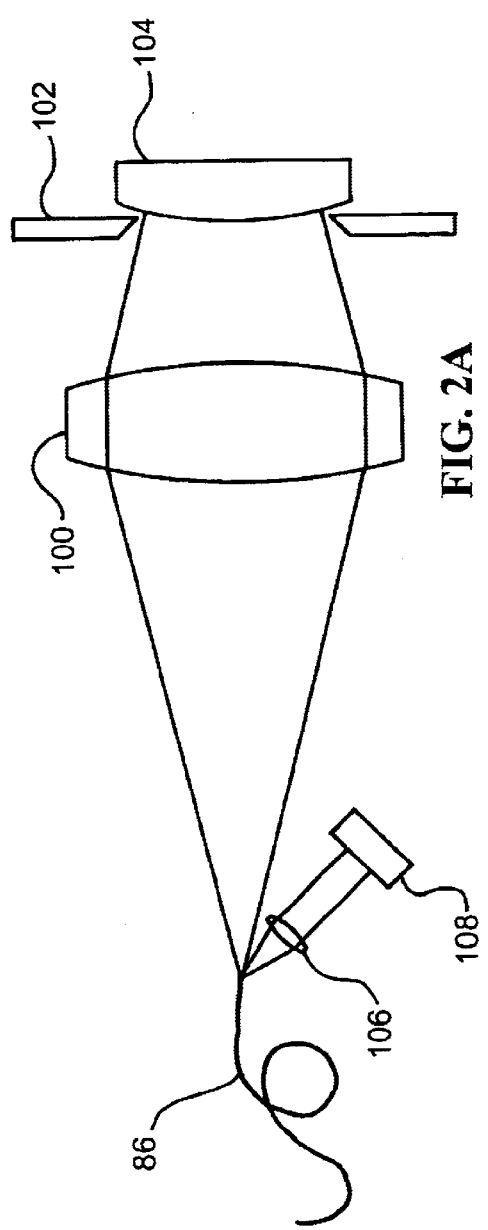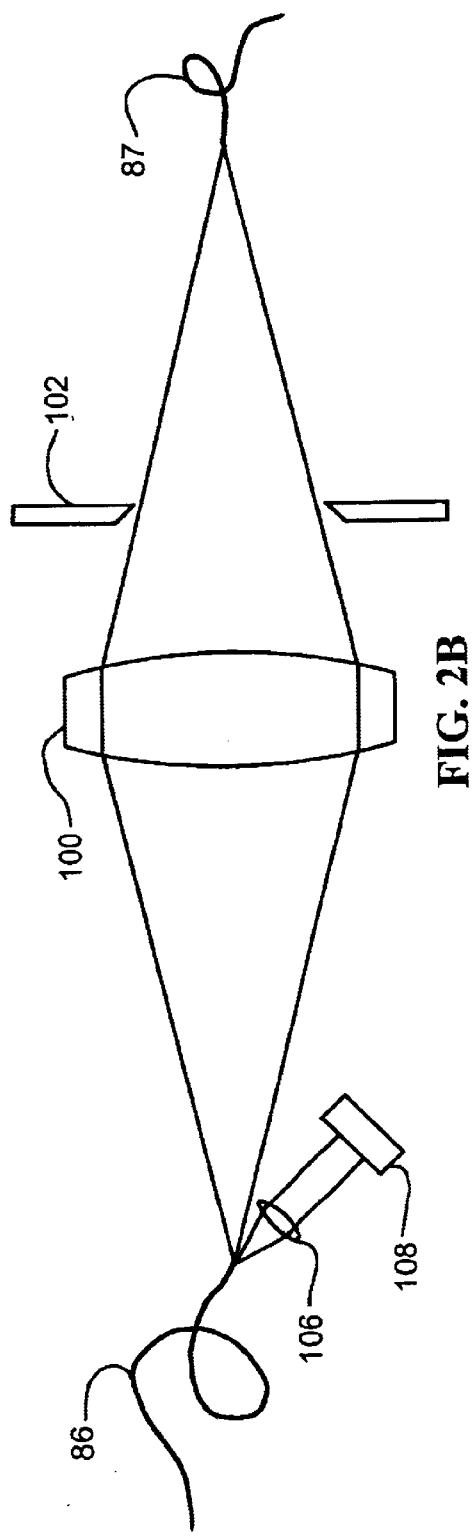

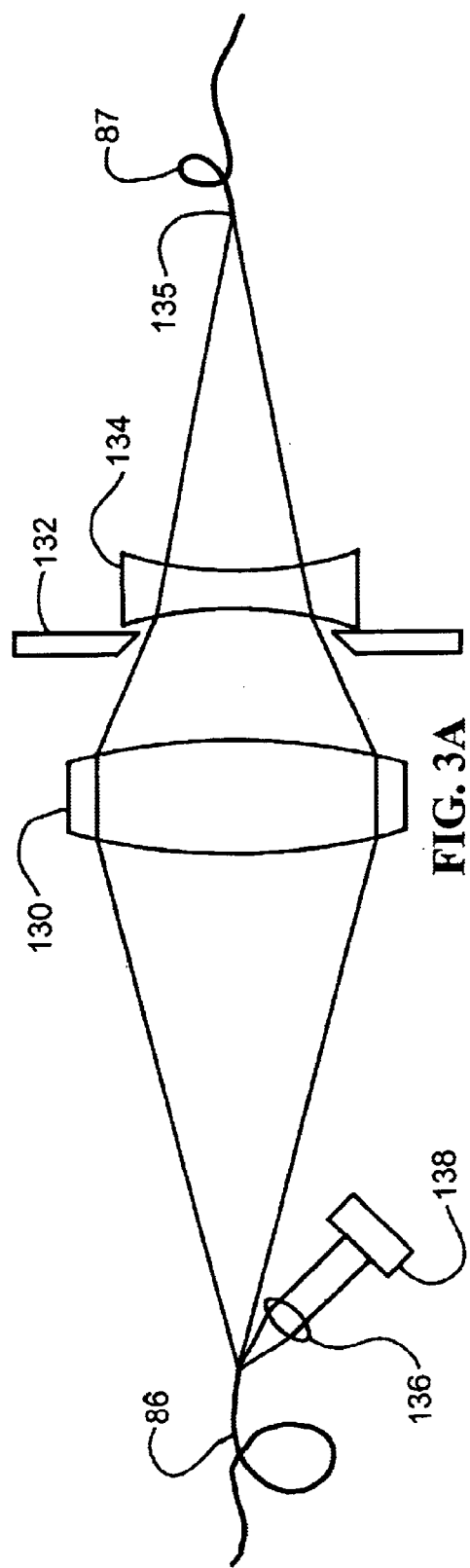
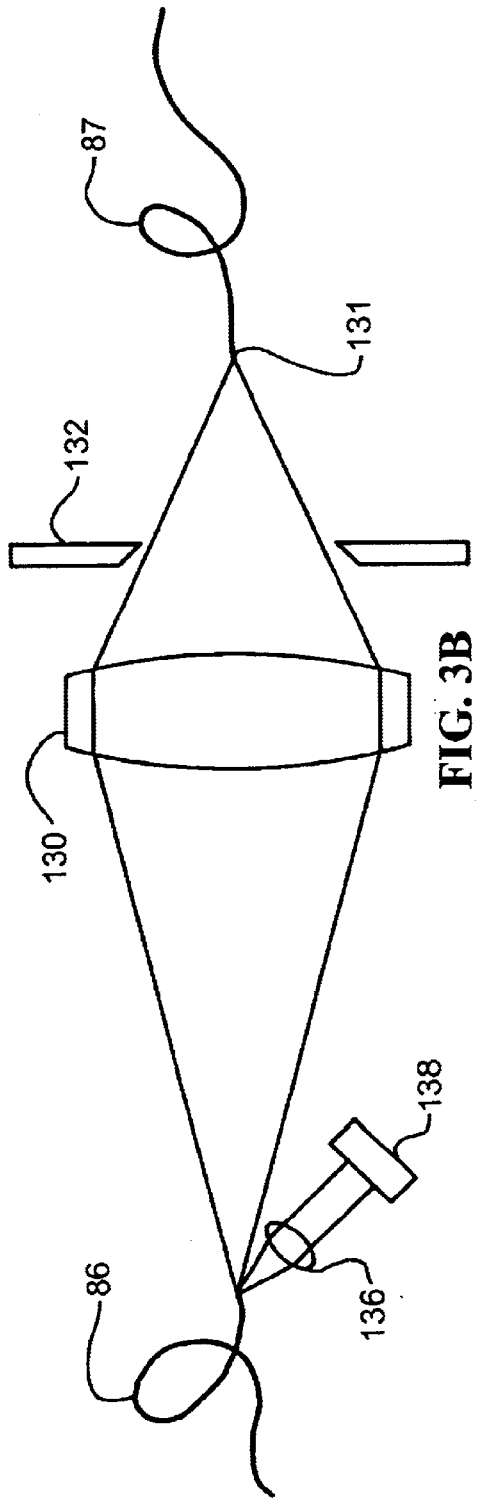
FIG. 3A
FIG. 3B

APPLICATION OF THE PHASE SHIFTING DIFFRACTION INTERFEROMETER FOR MEASURING CONVEX MIRRORS AND NEGATIVE LENSES

The United States Government has rights in this invention pursuant to Contract No. W-7405-ENG-48 between the United States Department of Energy and the University of California for the operation of Lawrence Livermore National Laboratory.

BACKGROUND OF THE INVENTION

1. Field of the Invention

The present invention relates to high accuracy diffraction interferometry, and more specifically, it relates to the use of embodiments of the Phase Shifting Interferometer to measure the aberrations of convex lenses and negative lenses.

2. Description of Related Art

Interferometry is the preferred method to measure the performance of optical elements and systems. In this method the wavefront of light reflected from or transmitted by the optic to be tested is interfered with the wavefront from a reference surface, to produce an interference fringe pattern. These interference fringes are then analyzed to ascertain the performance of the optic. For high performance imaging systems, such as those found in lithographic steppers used to make integrated circuits, this interferometric measurement must be made to ever increasing accuracy. The accuracy, however, is limited by how well the reference surface is characterized. Reference surfaces are typically no better than $\square/50$, where $\square$ is the wavelength of visible light, and thus are the limiting factor in fabricating higher performance optical systems. Therefore the fabrication of high accuracy optical systems, such as those needed for extreme ultraviolet projection lithography which require an accuracy of $\square/1000$, are impossible to qualify with confidence using existing interferometry.

The problem or difficulty with interferometrically measuring a convex mirror or a negative lens is that it is necessary to have a converging spherical wavefront incident on either of these two optics in order to make a measurement with an interferometer. This problem is particularly true of the phase measuring diffraction interferometer since it produces a perfect diverging spherical wavefront.

In order to produce a converging spherical wavefront, it is necessary to introduce a positive auxiliary lens into the interferometer. This will change the perfect diverging spherical wavefront into a converging wavefront. This converging wavefront will not, in general, be a perfect spherical wavefront due to errors in the positive auxiliary lens. This will introduce an error into the measurement. In conventional interferometers this error cannot be eliminated. However, the phase shifting diffraction interferometer is unique in that it can be configured in at least two different ways, permitting exact cancellation of the error.

SUMMARY OF THE INVENTION

It is an object of the present invention to provide methods utilizing the phase shifting diffraction interferometer for measuring the aberrations of convex mirrors and negative lenses.

Other objects of the invention will be apparent to those skilled in the art based on the teachings herein.

U.S. Pat. Nos. 5,548,403 and 5,933,236, disclose an interferometer that has the capability of measuring optical elements and systems with an accuracy of $\square/1000$ where $\square$ is the wavelength of visible light. Whereas current interferometers employ a reference surface, which inherently limits the accuracy of the measurement to about $\square/50$, this interferometer uses an essentially perfect spherical reference wavefront generated by the fundamental process of diffraction. This interferometer is adjustable to give unity fringe visibility, which maximizes the signal-to-noise, and has the means to introduce a controlled prescribed relative phase shift between the reference wavefront and the wavefront from the optics under test, which permits analysis of the interference fringe pattern using standard phase extraction algorithms. The patented interferometers maximize the signal-to-noise and permit analysis of interference fringe patterns using standard phase extraction algorithms.

The measurement of convex mirrors and negative lenses may be accomplished though the introduction of auxiliary interferometer optics into certain embodiments of the phase shifting interferometers described in the above described patents.

To measure a convex mirror, the reference beam and the measurement beam are first both provided through a single optical fiber. A positive auxiliary lens is placed in the system to give a converging wavefront onto the convex mirror under test. An aperture stop is located immediately after the positive lens. The aperture stop defines where the convex mirror to be tested will be located. The convex mirror is placed right at the aperture stop in such a way that the light is reflected back on itself from the surface of the convex mirror. The wavefront reflected from the convex mirror under test comes to focus on the end of the fiber where it is reflected off the face of the fiber and is combined with the wavefront coming directly out of the fiber. Both wavefronts are imaged onto a CCD camera. An interference pattern is observed at the CCD camera and recorded (stored). The interference pattern is analyzed by standard methods. This constitutes one of the measurements. This measurement includes the aberrations of the convex mirror as well as the errors due to two transmissions through the positive auxiliary lens. A second measurement provides the information to eliminate this error.

To make the second measurement, the first fiber, imaging lens, CCD camera, and aperture stop are left in exactly the same positions. It is important that they are not moved between the two measurements. The convex mirror under test is removed. A second optical fiber is placed at the focal position of the positive lens. For this second measurement, only the reference beam is provided through the original optical fiber and the measurement beam is provided through the second optical fiber. The measurement wavefront from the second optical fiber passes through the aperture stop, goes through the positive auxiliary lens and comes to focus on the face of the original optical fiber. It then reflects off the face of the original optical fiber and is combined with reference wavefront coming directly out of the first fiber. Both wavefronts are imaged onto the CCD camera. The interference pattern is analyzed by standard methods. This constitutes the second measurement. This measurement includes only errors due to a single transmission through the positive auxiliary lens. To obtain the aberration due to just the convex mirror, the second measurement is multiplied by 2 and the result is subtracted from the first measurement. An alternate embodiment for measuring a convex mirror is also provided.

A negative lens can also be measured in a similar way. Again, there are two measurement set-ups. The reference beam is provided from a first optical fiber and the measurement beam is provided from a second optical fiber. A positive auxiliary lens 130 is placed in the system to provide a converging wavefront to the reference beam. An aperture stop is placed immediately after the positive lens. The negative lens under test is placed at the aperture stop. The measurement fiber is placed at the focal position of the negative lens under test. The measurement wavefront passes through the negative lens and aperture stop, goes through the positive lens and comes to focus on the face of the reference optical fiber. It then reflects off the face of the reference optical fiber and is combined with the reference wavefront coming directly out of the reference fiber. Both wavefronts are imaged onto the CCD camera. The interference pattern located at the CCD camera is analyzed by standard methods. This constitutes one of the measurements. This measurement includes the aberrations of the negative lens, as well as the errors due to a single transmission through the positive auxiliary lens. A second measurement provides the information to eliminate this error.

To make the second measurement, the reference fiber, imaging lens, CCD camera, and aperture stop are left in exactly the same positions. It is important that they are not moved between the two measurements. The negative lens is removed. The measurement optical fiber is moved to the focal position of the positive auxiliary lens. The measurement wavefront from the measurement optical fiber passes through the aperture stop, goes through the positive auxiliary lens and comes to focus on the original optical fiber. It then reflects off the face of the original optical fiber and is combined with the reference wavefront coming directly out of the reference fiber. Both wavefronts are imaged onto the CCD camera. The interference pattern located at the CCD camera is analyzed by standard methods. This constitutes the second measurement. This measurement includes only errors due to a single transmission through the positive auxiliary lens. To obtain the aberration due to just the negative lens, the second measurement is subtracted from the first measurement. This eliminates the error due to the positive auxiliary lens and gives just the wavefront transmitted by the negative lens.

BRIEF DESCRIPTION OF THE DRAWINGS

FIGS. 2A and 2B show the two measurement configurations for measuring a convex mirror.

FIGS. 3A and 3B show the two measurement configurations for measuring a negative lens.

DETAILED DESCRIPTION OF THE INVENTION

The measurement of convex mirrors and negative lenses may be accomplished though the introduction of auxiliary interferometer optics into the phase shifting interferometers described in U.S. Pat. No. 5,548,403, titled "Phase Shifting Diffraction Interferometer" and U.S. Pat. No. 5,933,236, titled "Phase Shifting Interferometer", both patents incorporated herein by reference. These auxiliary optics would introduce measurement errors in conventional interferometers that are impossible to eliminate. However, the phase shifting diffraction interferometer is uniquely suited to measure convex mirrors and negative lenses with absolute accuracy. This is due to the ability to configure the interferometer two ways, unlike conventional interferometers.

Figure 1A:
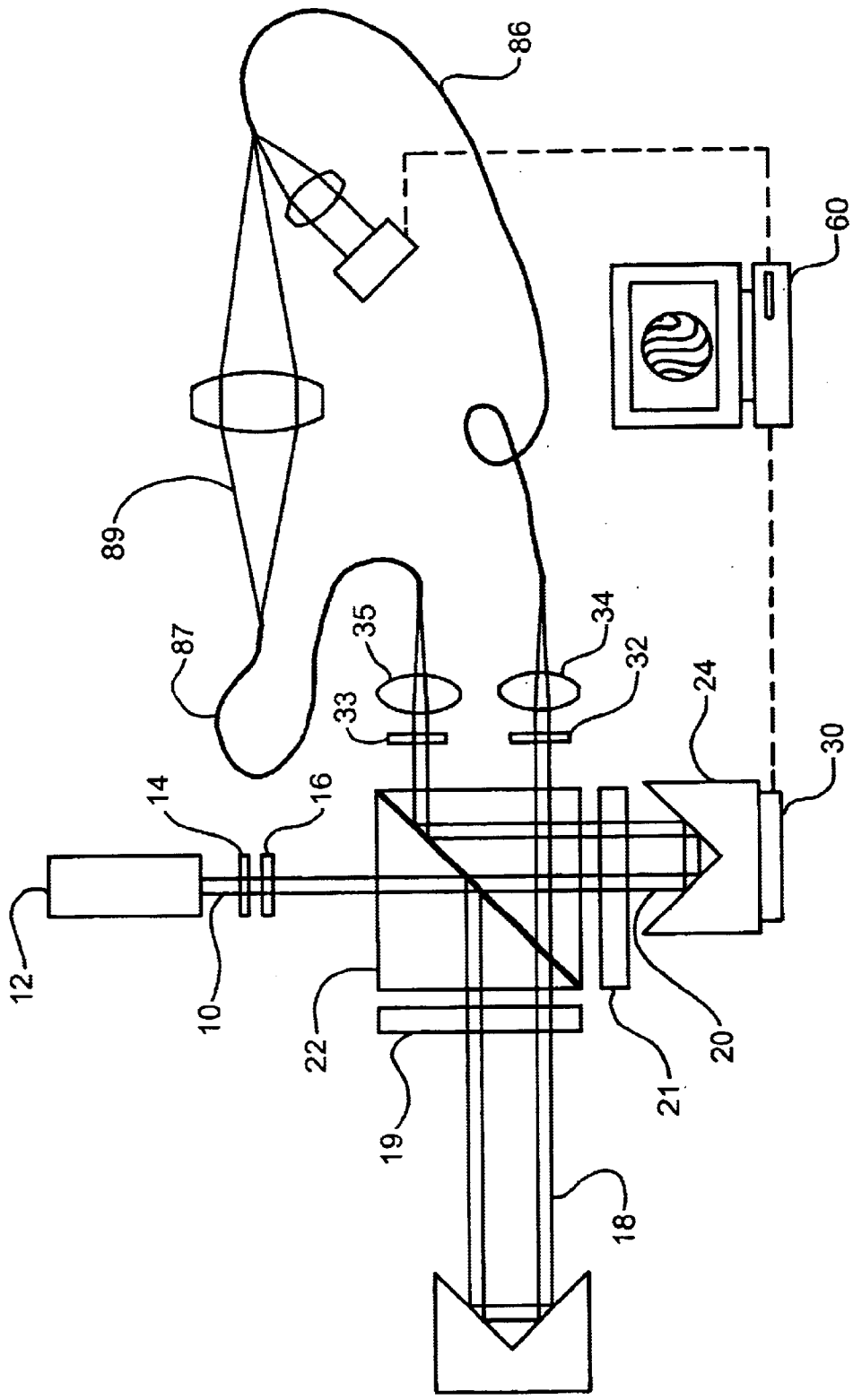
FIGS. 1A and 1B show two configurations of the phase shifting diffraction interferometer.
Figure 1B:
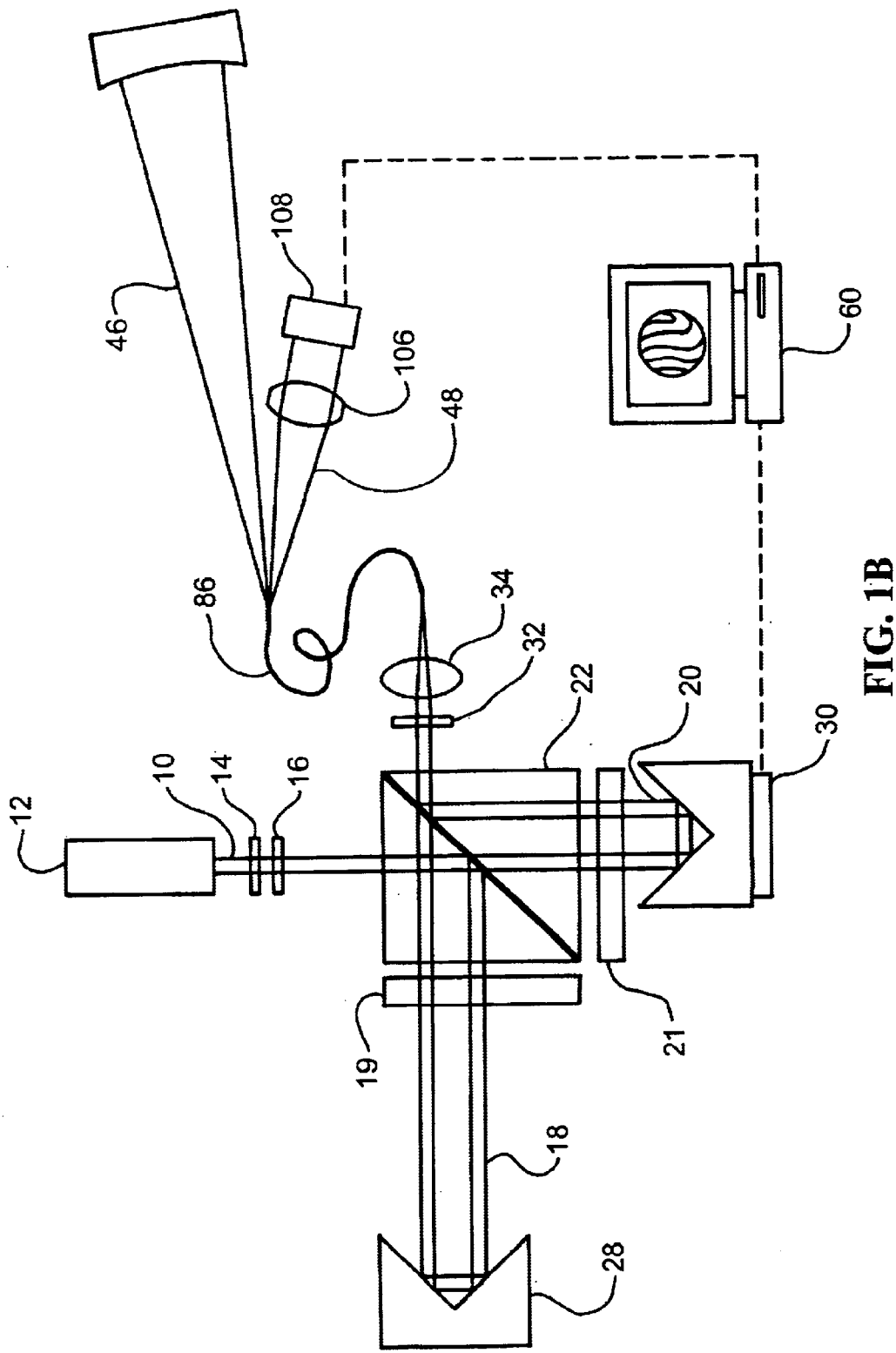

FIGS. 1A and 1B show two configurations of the phase shifting diffraction interferometer.

In FIG. 1A, the measurement and reference beams are focused into different optical fibers. FIG. 1A is generally similar to FIG. 4 in U.S. Pat. Nos. 5,548,403 and 5,933,236, and is more specifically similar to the embodiment shown in FIG. 10 of U.S. Pat. No. 5,933,236. In this embodiment light source 12 has a short coherence length. Beam 10 passes through variable neutral density filer 14 and half-wave plate 16, and is split by polarization beamsplitter 22 into beams 18 and 20, which are reflected back through the polarization beamsplitter 22 so they are coincident and collinear, either as shown in FIG. 10 of U.S. Pat. No. 5,933,236 or as shown in FIG. 1A of the present invention. Each beam 18 and 20 may pass through separate quarter-wave plates 19 and 21 respectively, to fine tune the polarization of each beam. Beam 18 passes through a polarizer 32 and is focused by microscope objective 34 into a single mode optical fiber 86. The far end of single mode optical fiber 86 serves the same purpose as interferometer plate 36, and is shown in detail in FIG. 9 of U.S. Pat. No. 5,933,236. Beam 20 passes through polarizer 33 and is brought to a focus with microscope objective 35, into a second single mode optical fiber 87. The measurement beam 89, leaving the end of single mode optical fiber 87, is diffracted, producing a perfect spherical wavefront over some finite solid angle. After passing through the optic 92 under test, aberrations are imparted to measurement beam 89. Focused measurement beam 89 is reflected by reflecting metal layer 90 on the surface of single mode optical fiber 86. It diverges and is coincident with reference beam 48 that is diffracted, producing a perfect spherical wavefront over some finite solid angle. For interference to take place, the length of single mode optical fibers 86 and 87 are equal and retroreflector 24 is positioned such that the optical path length ACD is equal to optical path length ABF+GH. Another requirement for interference to take place is that the polarization of reference beam 48 and measurement beam 89 be identical. This is accomplished by determining the polarization state of each beam, and then physically manipulating the fibers until the measurement beam 89 and the reference beam 48 have identical polarization states.

In FIG. 1B, the measurement and reference beams are focused into the same optical fiber. FIG. 1B is similar to FIG. 8 in U.S. Pat. No. 5,933,236, which is the same as in FIG. 7 in that patent, except that interferometer plate 36 is replaced by single mode optical fiber 6. The far end of single mode optical fiber 86 serves the same purpose as interferometer plate 36 of U.S. Pat. No. 5,933,236, and is shown in detail in FIG. 9 of the patent.

Measuring a Convex Mirror

FIGS. 2A and 2B show the two measurement configurations for measuring a convex mirror. In FIG. 2A, the reference beam and the measurement beam are both provided through a single optical fiber. The interferometer set-up for this portion of the measurement is shown in FIG. 1B, which produces a perfect diverging wavefront that includes both the reference and the measurement beams from fiber optic 86. As shown in FIG. 2A, a positive auxiliary lens 100 is placed in the system to give a converging wavefront. An aperture stop 102 is located immediately after the positive lens. The aperture stop defines where the convex mirror 104 will be located. The convex mirror is placed right at the aperture stop 102 in such a way that the light is reflected back on itself from the surface of the convex mirror 104. The reflected wavefront comes to focus on the end of the fiber 86 where it is reflected off the face of the fiber and is combined with the wavefront coming directly out of the fiber. Both wavefronts go through a small imaging lens 106 which images the aperture stop 102 on to the CCD camera 108. An interference pattern is observed at the CCD camera. This interference pattern is produced by the reference wavefront coming directly from the fiber 86 as it interferes with the measurement wavefront reflecting off the convex mirror 104 after the measurement wavefront reflects from the face of the fiber 86. The interference pattern is analyzed by standard methods. For example, Zygo Corporation produces "Metro Pro" software, Phase Shift Technology produces "Optic Code Analysis Software". WYKO Corporation produces "WISP" software. This constitutes one of the measurements. This measurement includes the aberrations of the convex mirror as well as the errors due to two transmissions through the positive auxiliary lens. A second measurement provides the information to eliminate this error.

To make the second measurement, the fiber 86, imaging lens 106, CCD camera 108, and aperture stop 102 are left in exactly the same positions. It is important that they are not moved between the two measurements. The convex mirror 104 is removed. A second optical fiber 87 is placed at the focal position of the positive lens 100. For this second measurement, FIG. 2B is modified as shown in FIG. 1A. In FIG. 2B, the reference beam is provided through the original optical fiber 86 and the measurement beam is provided through the second optical fiber 87. The measurement wavefront from the second optical fiber passes through the aperture stop 102, goes through the positive auxiliary lens 100 and comes to focus on the face of the original optical fiber 86. It then reflects off the face of the original optical fiber and is combined with reference wavefront coming directly out of the fiber 86. Both wavefronts again go through the small imaging lens 106 which images the aperture stop 102 onto the CCD camera 108. At the CCD camera is located an interference pattern of the reference wavefront coming directly from the fiber and the measurement wavefront transmitted by the positive auxiliary lens. The interference pattern is analyzed by standard methods. This constitutes the second measurement. This measurement includes only errors due to a single transmission through the positive auxiliary lens.

To obtain the aberration due to just the convex mirror, the second measurement is multiplied by 2 and the result is subtracted from the first measurement. This eliminates the error due to the positive auxiliary lens. To get the surface figure of the convex mirror, the result is divided by two.

Figure 2C:
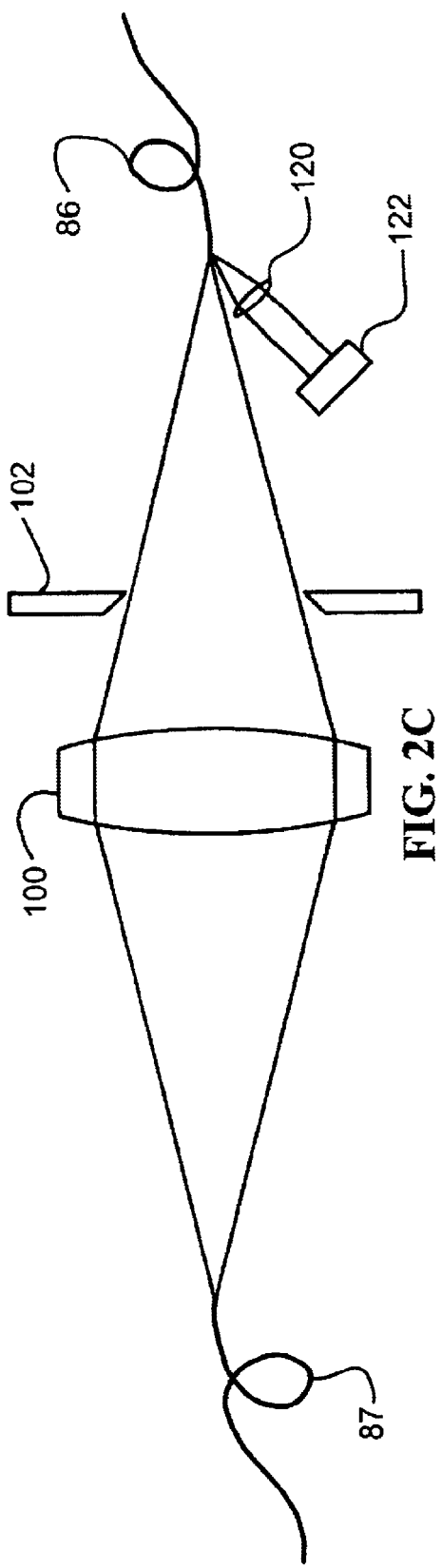
FIGS. 2C and 2D show an alternate configuration for measuring a convex mirror.
Figure 2D:
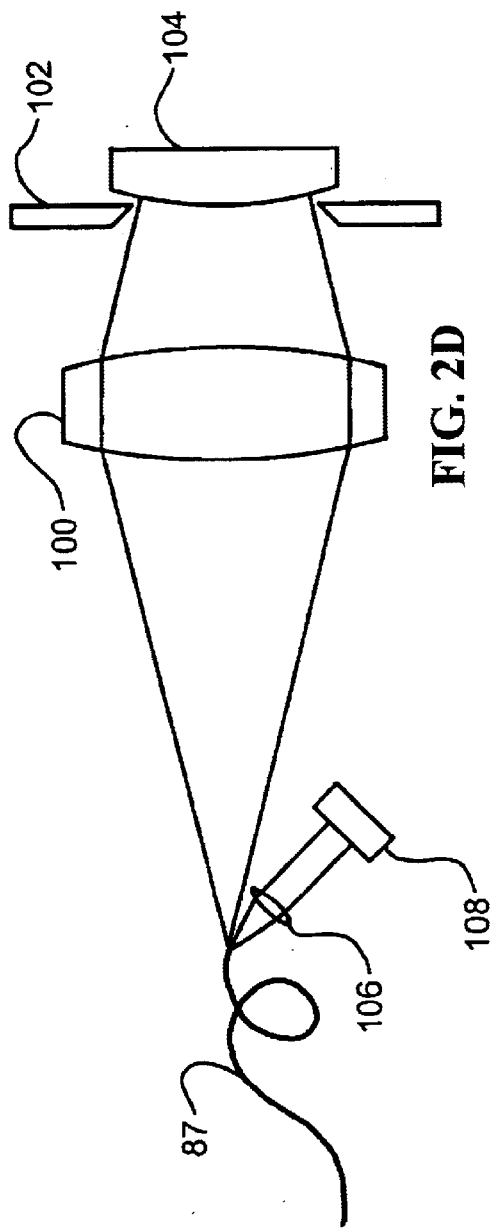

An alternate embodiment for measuring a convex mirror is illustrated in FIGS. 2C and 2D. The interferometer of FIG. 1A provides a diverging measurement beam from fiber 87. Positive lens 100 converts the beam into a converging beam that passes through aperture stop 102 and is focused onto the face of reference fiber 86, which reflects the measurement beam to imaging lens 120 and onto CCD camera 122. A portion of the reference wavefront diverging from reference fiber 86 is also imaged by imaging lens 120 onto CCD camera 122. This produces an interference pattern that is analyzed by standard methods. This constitutes one of the measurements and includes the aberrations due to a single transmission through the positive auxiliary lens. A second measurement gives us the information to eliminate this error.

In the second measurement, the interferometer is configured as shown in FIG. 2D. Both the measurement and the reference wavefront are provided from a single fiber optic 86, as shown in FIG. 1B. The measurement beam passes through positive lens 100 and converges onto the convex mirror 104 under test located at the aperture stop 102. Convex mirror 104 reflects the beam back through the positive lens 100 that refocuses the beam onto the face of fiber optic 86, which reflects the beam to imaging lens 106 and onto CCD camera 108. This produces an interference pattern that is analyzed to produce a second measurement that includes the errors due to the convex mirror 104 and the errors due to two passes through the positive lens 100. The aberrations due to a single transmission through the positive lens 100, as determined from the first measurement, as discussed with respect to FIG. 2C, are multiplied by 2 and the result is subtracted from the measurement taken in FIG. 2D to provide the aberrations produced only by the convex mirror 104 under test.

Measuring a Negative Lens

A negative lens can also be measured in a similar way. Again, there are two measurement set-ups as shown in FIGS. 3A and 3B. The reference beam is in the optical fiber 86 to the left and the measurement beam is in the optical fiber 87 to the right. In FIG. 3A, a positive auxiliary lens 130 is placed in the system to provide a converging wavefront to the light coming from fiber 86. An aperture stop 132 is located immediately after the positive lens. The negative lens 134 is placed at the aperture stop 132. The measurement fiber 87 is placed at the focal position 135 of the negative lens 134. The measurement wavefront passes through the negative lens 134 and aperture stop 132, goes through the positive lens 130 and comes to focus on the face of the reference optical fiber 86. It then reflects off the face of the reference optical fiber and is combined with the reference wavefront coming directly out of the fiber 86. Both wavefronts go through a small imaging lens 136 which images the aperture stop onto the CCD camera 138. At the CCD camera is located an interference pattern of the reference wavefront coming directly from the fiber and the measurement wavefront transmitted through the negative lens. The interference pattern is analyzed by standard methods. This constitutes one of the measurements. This measurement includes the aberrations of the negative lens 134 (which is an object of the measurement), as well as the errors due to a single transmission through the positive auxiliary lens. A second measurement provides the information to eliminate this error.

To make the second measurement, the reference fiber 86, imaging lens 136, CCD camera 138, and aperture stop 132 are left in exactly the same positions. It is important that they are not moved between the two measurements. The negative lens 134 is removed. The measurement optical fiber 87 is moved to the focal position 131 of the positive auxiliary lens 130 as shown in FIG. 3B. The measurement wavefront from the measurement optical fiber 87 passes through the aperture stop 132, goes through the positive auxiliary lens 130 and comes to focus on the original optical fiber 86. It then reflects off the face of the original optical fiber 86 and is combined with the reference wavefront coming directly out of the fiber 86. Both wavefronts again go through the small imaging lens 136 which images the aperture stop 132 on to the CCD camera 138. At the CCD camera 138 is located an interference pattern of the reference wavefront coming directly from the fiber and the measurement wavefront transmitted by the positive auxiliary lens. The interference pattern is analyzed by standard methods. This constitutes the second measurement. This measurement includes only errors due to a single transmission through the positive auxiliary lens.

To obtain the aberration due to just the negative lens, subtract the second measurement from the first measurement. This eliminates the error due to the positive auxiliary lens and gives just the wavefront transmitted by the negative lens.

The foregoing description of the invention has been presented for purposes of illustration and description and is not intended to be exhaustive or to limit the invention to the precise form disclosed. Many modifications and variations are possible in light of the above teaching. The embodiments were chosen and described to best explain the principles of the invention and its practical application to thereby enable others skilled in the art to best use the invention in various embodiments and with various modifications suited to the particular use contemplated. The scope of the invention is to be defined by the following claims.

We claim:

1. A method for measuring the aberrations of a convex mirror, comprising:

producing a reference wavefront and a first measurement wavefront of light both diverging from a first diffracting aperture and phase shifted relative to each other;

propagating a portion of said reference wavefront onto a detector;

converting a portion of said first measurement wavefront from a diverging to a converging wavefront to produce a converted first measurement wavefront;

positioning a convex mirror under test in said converted first measurement wavefront such that said convex mirror modifies and substantially reflects said converted first measurement wavefront to produce a modified converted first measurement wavefront;

introducing an aperture stop at said convex mirror under test;

converting a portion of said modified converted first measurement wavefront from a diverging to a converging wavefront to produce a modified first measurement wavefront;

reflecting said modified first measurement wavefront from a surface of said diffracting aperture onto said detector, wherein said reference wavefront and said modified first measurement wavefront combine to form a first interference pattern on said detector;

producing a second measurement wavefront of light diverging from a second diffracting aperture that is spatially separated from said first diffracting aperture, wherein said second measurement wavefront is phase shifted relative to said reference wavefront;

traversing said second measurement wavefront over the same optical path, less said convex mirror under test, as said modified first measurement wavefront; and combining said second measurement wavefront and said reference wavefront to produce a second interference pattern on said detector.

2. The method of claim 1, wherein either or both of said first diffracting aperture and said second diffracting aperture comprise a planar diffracting aperture selected from the group consisting of a single mode fiber optic and a pinhole in a reflective substrate.

3. The method of claim 1, wherein the step of converting a portion of said first measurement wavefront from a diverging to a converging measurement wavefront comprises introducing into said first measurement wavefront an auxiliary optical element selected from the group consisting of a positive lens and a concave mirror.

4. The method of claim 1, further comprising introducing an imaging lens for imaging said aperture stop onto said detector.

5. The method of claim 2, wherein said single mode fiber optic comprises an output end having a reflecting layer.

6. The method of claim 1, wherein said detector comprises a CCD camera.

7. The method of claim 1, further comprising analyzing said first interference pattern to determine a first calculated wavefront comprising the sum of the aberrations of said convex mirror and errors due to two transmissions through said auxiliary optical element and further comprising analyzing said second interference pattern to determine a second calculated wavefront due to a single transmission through said auxiliary optical element alone.

8. The method of claim 7, further comprising obtaining aberrations of said convex mirror by multiplying said second calculated wavefront by 2 and subtracting the result from said first calculated wavefront.

9. The method of claim 8, further comprising obtaining the surface shape of said convex mirror by dividing said aberrations of said convex mirror by 2.

10. The method of claim 1, wherein said second interference pattern is produced by interchanging said second measurement wavefront with said reference wavefront and associated said detector.

11. An apparatus for measuring the aberrations of a convex mirror, comprising:

means for producing a reference wavefront and a first measurement wavefront of light both diverging from a first diffracting aperture and phase shifted relative to each other;

a detector positioned in the path of a portion of said reference wavefront;

means for converting a portion of said first measurement wavefront from a diverging to a converging wavefront to produce a converted first measurement wavefront;

wherein a convex mirror under test positioned in said converted first measurement wavefront will modify and substantially reflect said converted first measurement wavefront to produce a modified converted first measurement wavefront;

an aperture stop positioned at said convex mirror under test;

means for converting a portion of said modified converted first measurement wavefront from a diverging to a converging wavefront to produce a modified first measurement wavefront;

means for reflecting said modified first measurement wavefront from a surface of said diffracting aperture onto said detector, wherein said reference wavefront and said modified first measurement wavefront will combine to form a first interference pattern on said detector; and means for producing a second measurement wavefront of light diverging from a second diffracting aperture that is spatially separated from said first diffracting aperture, wherein said second measurement wavefront is phase shifted relative to said reference wavefront, wherein said second measurement wavefront will traverse over the same optical path, less said convex mirror under test, as said modified first measurement wavefront to combine with said second measurement wavefront and said reference wavefront to produce a second interference pattern on said detector.

12. The apparatus of claim 11, wherein either or both of said first diffracting aperture and said second diffracting aperture comprise a planar diffracting aperture selected from the group consisting of a single mode fiber optic and a pinhole in a reflective substrate.

13. The apparatus of claim 11, wherein said means for converting a portion of said first measurement wavefront from a diverging to a converging measurement wavefront comprises an auxiliary optical element selected from the group consisting of a positive lens and a concave mirror.

14. The apparatus of claim 11, further comprising an imaging lens for imaging said aperture stop onto said detector.

15. The apparatus of claim 12, wherein said single mode fiber optic comprises an output end having a reflecting layer.

16. The apparatus of claim 11, wherein said detector comprises a CCD camera.

17. The apparatus of claim 11, further comprising a computer readable memory including software for analyzing said first interference pattern to determine a first calculated wavefront comprising the sum of the aberrations of said convex mirror and errors due to two transmissions through said auxiliary optical element and further comprising software for analyzing said second interference pattern to determine a second calculated wavefront due to a single transmission through said auxiliary optical element alone.

18. The apparatus of claim 17, wherein said computer readable memory further comprises software for obtaining aberrations of said convex mirror by multiplying said second calculated wavefront by 2 and subtracting the result from said first calculated wavefront.

19. The apparatus of claim 18, wherein said computer readable memory further comprises software for obtaining the surface shape of said convex mirror by dividing said aberrations of said convex mirror by 2.

20. The apparatus of claim 11, wherein said second interference pattern is produced by interchanging said second measurement wavefront with said reference wavefront and associated said detector.

* * * * *